United States Patent [19]

Hornschuh

[11] Patent Number: 4,520,389

[45] Date of Patent: May 28, 1985

[54] METHOD OF MOUNTING PRINTING BLOCKS IN CORRECT POSITIONS ON FORM CYLINDERS OF FLEXOGRAPHIC PRINTING MACHINES FOR MULTICOLOR PRINTING

[75] Inventor: Manfred Hornschuh, Hilter, Fed. Rep. of Germany

[73] Assignee: Windmoller & Holscher, Lengerich, Fed. Rep. of Germany

[21] Appl. No.: 473,277

[22] Filed: Mar. 8, 1983

[30] Foreign Application Priority Data

Mar. 16, 1982 [DE] Fed. Rep. of Germany ....... 3209484

[51] Int. Cl.³ ......................... H04N 7/18; H04N 7/00

[52] U.S. Cl. ...................................... 358/107; 358/93; 358/101; 33/184.5; 101/DIG. 12

[58] Field of Search .............. 33/184.5; 101/DIG. 12, 101/368, 382, 415.1; 358/93, 101, 107

[56] References Cited

U.S. PATENT DOCUMENTS

| | | | |
|---|---|---|---|
| 3,494,234 | 2/1976 | Jackson | 101/DIG. 12 |
| 3,988,535 | 10/1976 | Hickman et al. | 358/101 |
| 4,389,669 | 6/1983 | Epstein et al. | 358/101 |
| 4,449,452 | 5/1984 | Mansell | 33/184.5 |
| 4,481,533 | 11/1984 | Alzmann et al. | 358/107 |

*Primary Examiner*—Howard W. Britton

*Assistant Examiner*—John K. Peng

*Attorney, Agent, or Firm*—Fleit, Jacobson, Cohn & Price

[57] ABSTRACT

The invention relates to a method of mounting printing blocks on form cylinders of a flexographic printing machine for multicolor printing in correct positions determined by a mounting pattern, which is secured to a mounting cylinder or mounting table. Two television cameras are directed to two spaced apart points of the mounting pattern, two television cameras are directed to two spaced apart points of the printing block carried by the form cylinder. Said television cameras are disposed in exactly fixed and mutually corresponding positions relative to the mounting cylinder or mounting table and relative to each form cylinder, when the same is in mounting position. The two images of corresponding points of the mounting pattern and of the printing block are displayed under the control of a mixer by a television screen at the same time. The printing block is initially slidably mounted on the form cylinder and is adjusted until the images displayed on the television screen coincide. The printing block is then secured to the form cylinder in that position. The printing blocks for the other form cylinders used for multicolor printing are adjusted on and secured to said cylinders in the same manner in succession with reference to the same mounting pattern.

6 Claims, 1 Drawing Figure

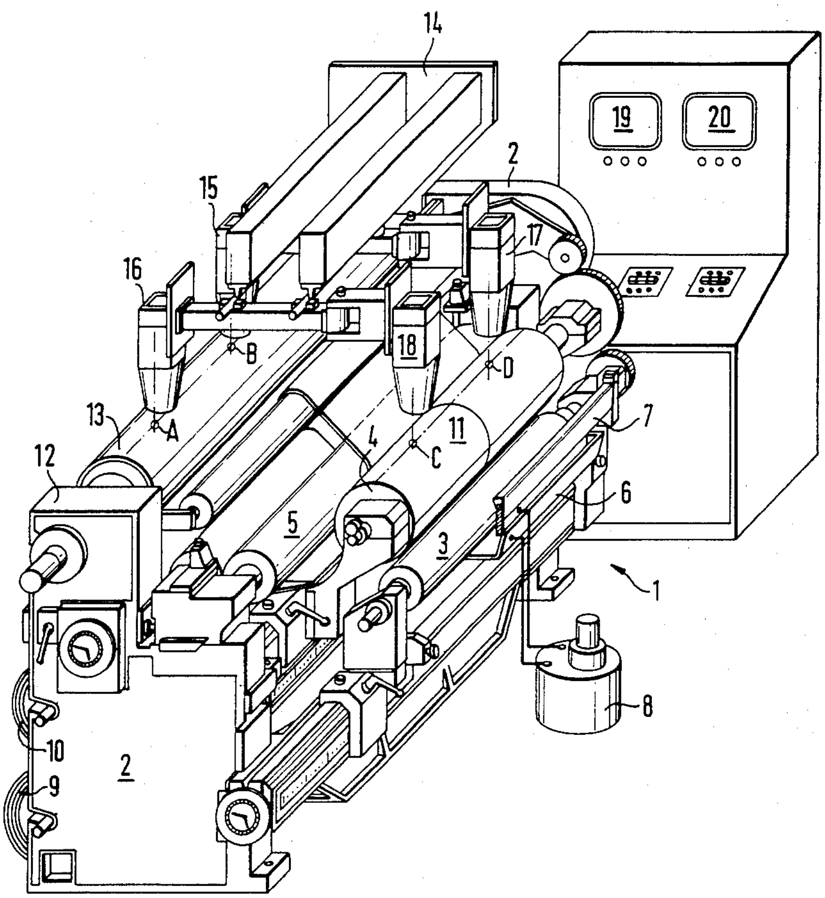
14
19
20
2
15
17
16
B
18
D
13
A
4
11
C
7
12
5
6
3
1
8
10
2
9

METHOD OF MOUNTING PRINTING BLOCKS IN CORRECT POSITIONS ON FORM CYLINDERS OF FLEXOGRAPHIC PRINTING MACHINES FOR MULTICOLOR PRINTING

BACKGROUND OF THE INVENTION

This invention relates to a method of mounting printing blocks on form cylinders of a flexographic printing machine for multicolor printing in correct positions determined by a mounting pattern, which is secured to a mounting cylinder or mounting table.

For mounting printing blocks in correct positions on form cylinders it was previously usual to adhesively join a registration sheet to a mounting cylinder and to use the registration sheet as a reference sheet for checking the position of the printing block. Exact registration lines for the print had previously been drawn by hand on the registration sheet. These registration lines, i.e., the contour lines of the printing block, were then transferred by means of a mirror to the form cylinder. Thereafter, the printing block was adhesively joined to the form cylinder by hand in the pattern formed on the form cylinder by the registration lines which had been transferred by means of a mirror. Ink was then applied by hand to the printing block and a proof was printed on the registration sheet. When the printing block had been finally aligned, the form cylinder carrying the printing block was removed and the form cylinder for the next color was hung into the mounting device. When the registration lines had again been transferred by means of the mirror, the printing block was secured to that form cylinder.

The registration lines drawn on the registration sheet by hand differed in thickness. These inevitable inaccuracies regarding the line thickness were transferred by the mirror to the form cylinder so that it was not possible to mount and secure the printing blocks with exactly straight edges. The inaccuracies increased with the distance from the mirror to the form cylinder. Owing to the fine line screens on the printing blocks, it is absolutely essential that all printing blocks used for the multicolor printing are secured to the form cylinders with exactly straight edges. For this reason a partial offset of the screen line intersections relative to each other was inevitably involved in the known method of mounting the printing blocks and the printed colors were blurred. As the inaccurate prints obtained from the printing blocks which had been mounted on the form cylinders by the known method were due to the fact that the printing blocks had been mounted in an oblique position, it was not possible to improve the print by an automatic registration control.

SUMMARY OF THE INVENTION

It is an object of the invention to provide a method which is of the kind stated first hereinbefore and by which the printing blocks can be mounted on the form cylinders in identical positions and with straight edges so that the lines screens of the printing blocks used for multicolor printing are exactly in register.

This object is accomplished according to the invention in that two television cameras are directed to two spaced apart points of the mounting pattern, two television cameras are directed to two spaced apart points of the printing block carried by the form cylinder, said television cameras are disposed in exactly fixed and mutually corresponding positions relative to the mounting cylinder or mounting table and relative to each form cylinder, when the same is in mounting position, the two images of corresponding points of the mounting pattern and of the printing block are converted into electronic signals by the television cameras and transmitted to a remote location where the signals are reconverted into images and are displayed under the control of a mixer by a television screen at the same time, the printing block is initially slidably mounted on the form cylinder and is adjusted until the images displayed on the television screen coincide, the printing block is then secured to the form cylinder in the adjusted position, and the printing blocks for the other form cylinders used for multicolor printing are adjusted on and secured to said cylinders in the same manner in succession with reference to the same mounting pattern. By means of the method according to the invention, all printing blocks can be adjusted on and secured to the form cylinders without parallax errors and the like. The work is greatly facilitated by the fact that the mounting cylinder need not be arranged in a predetermined position relative to the form cylinder. The arrangement of the television cameras in exactly fixed positions ensures that all printing blocks will be mounted on the form cylinders with straight edges.

For an exact adjustment of the printing blocks, the points which are selected are suitably disposed on opposite sides of the mounting pattern and of the printing block on the form cylinder. The two points may be diagonally spaced apart.

Printing blocks having a relatively large thickness, e.g., of 3 mm, and consist of flexible material are usually employed for flexographic printing and are applied to the form cylinders to hug the same so that the outside surfaces of the printing blocks are elongated in the peripheral direction, which corresponds to the printing direction. That elongation is so large relative to the high definition of the line screen that it is not possible in many cases to adjust the printing blocks on the form cylinders to the correct positions and to secure them in such positions unless that elongation is taken into account. In the known method of adjusting the printing blocks with the aid of registration lines transferred by means of a mirror from a registration sheet, it is hardly possible to take the distortions caused by the elongation into account in the patterns formed by the registration lines transferred to the form cylinders by means of the mirror so that additional inaccuracies are due to the distortions caused by the elongations.

In order to preclude in the transfer from the registration sheet to the form cylinder the errors caused by the elongations, a further feature of the invention resides in that the mounting pattern which is to be secured to the mounting cylinder has been drawn with a distortion relative to the original image to be printed so as to take into account the elongation which is imparted to the outside surface of the printing block in the printing direction (peripheral direction) when the printing block is applied to the form cylinder. The original is the picture which is to be printed.

To permit a movement of the printing block on the form cylinder during the mounting operation, a further feature of the invention resides in that the printing block is held by a vacuum as it is adjusted on the form cylinder.

For an exact mounting it is essential that the cameras directed to the mounting pattern and those directed to the printing block are identically adjusted. For this reason it is a further feature of the invention that the cameras directed to the form cylinder are adjusted in height until a portion of the mounting pattern which has been applied to the form cylinder on the level of the printing block is displayed on the television screen in registration with the display of the corresponding portion of the mounting pattern. For this purpose, identical pictures are mounted on the mounting cylinder and the form cylinder at the same radial distance from the axis of the respective cylinder and the fact that the corresponding displays on the monitor are in register will indicate that the cameras have been adjusted to the same height.

According to a further feature of the invention, an undistorted pattern corresponding to the original is secured to the mounting cylinder, the outputs of the cameras directed to the original are processed by a computer in consideration of the elongation of the printing block applied to the form cylinder and a distorted picture of the original is displayed on the two television screens under the control of the computer and the respective mixers. In that embodiment the distortion is effected by a processing of data so that it is not necessary to prepare a correspondingly distorted picture. Programs in which the thickness of different printing blocks and the thickness of the adhesive layer have been taken into account can be replaceably provided and stored in ROMs or the like.

In order to permit an adjustment of the cameras to identical positions also when the distortion is effected by a computer, the original may be provided with lines which are transverse to the printing direction and have a predetermined color and these lines may be transferred without a distortion.

When the method according to the invention is to be carried out, for instance, a film negative is prepared which shows the picture that is to be printed on a package or the like. That negative picture has the same size as the picture to be printed. The distortion factor which is due to the elongation of the printing block in the direction of movement of the picture is determined by a processing of data in consideration of the thickness of the printing block, the thickness of the adhesive layer joining the printing block to the form cylinder, the diameter of the printing block and the elongation factor of the material of the printing block. A new negative photograph is then prepared, which shows a picture which is distorted in the peripheral direction (printing direction) in consideration of the elongation factor that has been computed. That negative showing the distorted picture is applied to the mounting cylinder and is fixed to the latter, e.g., with transparent adhesive tape, and is illuminated with transmitted light. Alternatively, the mounting cylinder may be provided with a fluorescent layer under the negative showing the distorted picture. The two cameras directed to the mounting cylinder will then cause the distorted picture to be displayed on the associated television screen under the control of a mixer. The prepared printing block is thereafter loosely applied to the form cylinder and is slidably held thereon, e.g., by means of a vacuum. The cameras directed to the printing block are so adjusted that their distance from the surface of the printing block is exactly as large as the distance from the mounting pattern to the cameras directed to said mounting pattern.

When the printing block held on the form cylinder by the vacuum has been adjusted, it can be secured by means of tape which is coated with adhesive on both sides. For this purpose, portions of the printing block which are not sucked to the form cylinder are raised and the adhesive tape is inserted under said portions. When the vacuum has been removed, those portions of the printing block which had previously been sucked by the vacuum can be adhesively joined to the form cylinder in the same manner.

In a first embodiment of the method, a properly distorted mounting pattern is secured to the auxiliary or mounting cylinder. In a second embodiment a photographic film showing an undistorted picture is applied to the mounting cylinder so that said picture is properly positioned. That picture is then scanned by means of a scanner and a computer is operated to cause the display of a distorted picture by the monitor. That distorted picture, which corresponds to the printing blocks, is then used as a reference for the adjustment of the printing blocks with straight edges.

BRIEF DESCRIPTION OF THE DRAWINGS

An illustrative embodiment of the invention will now be explained more fully with reference to the drawing, which in its single FIGURE shows in a perspective view a machine for adhesively mounting printing blocks and for printing proofs from said printing blocks as well as a mounting cylinder mounted on the machine and television cameras and monitors used for the adjustment of the printing blocks.

DESCRIPTION OF THE PREFERRED EMBODIMENTS

The machine for adhesively mounting printing blocks and for printing proofs from the printing blocks comprises a frame 2, in which a line screen cylinder 3, a form cylinder 4, an impression cylinder 5 and guiding and deflecting rollers are mounted. A doctor 7 is disposed above the ink fountain 6 and in the usual manner engages the screen cylinder 3. The ink is circulated by a pump, which is contained in a reservoir 8, which is connected to the ink fountain by ink lines in the usual manner.

The paper to be printed is unwound from a roll 9 and when it has been printed is wound up on a roll 10.

The printing block to be secured to the form cylinder 4 is first mounted on said cylinder so that it is movable relative to the cylinder 4. A mounting pattern is secured to a mounting cylinder 13, which is rotatably mounted in a superstructure 12 carried by the frame 2.

A bracket 14 secured to the frame 2 carries four television cameras 15, 16, 17, 18, which are adjustably mounted. The television cameras 15, 16 are directed to spaced apart points A and B of the mounting pattern. The television cameras 17, 18 are directed to the corresponding points C and D of the printing block 11, which is to be adjusted on the form cylinder 4. The images received by the television cameras 16, 18 appear in the monitor 19 as superimposed displays. The images received by the television cameras 15, 17 are displayed by the monitor 20. To adjust the printing block 11 on the form cylinder 4, the printing block 11 is moved until the pictures of points A and C on the monitor 19 are in register and the pictures of the points B and D on the monitor 20 are in register. When the displays of the points on each of the monitors 19, 20 are in register, the printing block is secured to the form cylinder 4 for the following printing operation.

When the printing blocks have been adjusted and secured to the form cylinder, the quality of the print which will be obtained is checked in that a proof in a given color is printed on the paper web 9, 10. When the proof is satisfactory, the form cylinder 4 carrying the printing block 11 is removed from the machine and is inserted for the production into the printing mechanism of a known multicylinder machine for flexographic printing.

Another form cylinder for a different color is then inserted into the above-described machine for mounting printing blocks and for printing proofs, and another printing block is adjusted and secured in perfect register in the manner which has been described. Then another proof is printed and that cylinder is also inserted into the production machine.

All other form cylinders in a number depending on the number of colors to be printed in the production machine are provided with respective printing blocks in the same manner.

Alternatively, the printing blocks may be adjusted on and secured to the respective printing cylinders when the latter have been fitted in the printing mechanisms in which the form cylinders are to be used for the subsequent printing operation.

What is claimed is:

1. A method of mounting a printing block on a form cylinder of a flexographic printing machine for multicolor printing in phase with a mounting pattern secured to a mounting cylinder, said method comprising:

converting into electronic signals an image of each of two spaced apart points located on the mounting pattern and of each of two spaced apart points located on the printing block mounted on the form cylinder, viewed from fixed and mutually corresponding locations relative to the mounting cylinder and relative to the form cylinder, transmitting said electronic signals to a remote location, reconverting said electronic signals into images at said remote location, adjusting the location of the printing block on the form cylinder until the reconverted images of the corresponding points for each spaced apart point on the mounting pattern and on the printing block are in register, and securing the printing block to the form cylinder at the adjusted location.

2. A method according to claim 1, further comprising forming the mounting pattern with a distortion compared to an original image to be printed so as to take into account the elongation which is imparted to the outside surface of the printing block in the printing direction when the printing block is applied to the form cylinder.

3. A method according to claim 1, further comprising holding the printing block by a vacuum as it is adjusted on the form cylinder.

4. A method according to claim 1, further comprising securing an undistorted mounting pattern corresponding to an original mounting pattern on the mounting cylinder, and adjusting the printing block on the form cylinder until the images of the corresponding points for each spaced apart point of the mounting pattern and the printing block coincide considering the elongation of the printing block when applied to the form cylinder.

5. A method according to claim 1, wherein the images of the corresponding points of the mounting cylinder and the printing block are viewed from the same height when a portion of the mounting pattern applied to the form cylinder is in registration with a corresponding portion of the mounting pattern.

6. A method according to claim 5, wherein the images of the corresponding points of the mounting cylinder and the printing block are viewed from the same height when an undistorted display of lines are seen which extend transversely to the printing direction and are distinguished by a predetermined color.

* * * * *